Sept. 18, 1951    J. B. CLARK    2,568,184
FILTER ELEMENT
Filed Oct. 24, 1946    2 Sheets-Sheet 1

INVENTOR.
Joel B. Clark
BY
Parker, Brochmon & Farmer,
Attorneys.

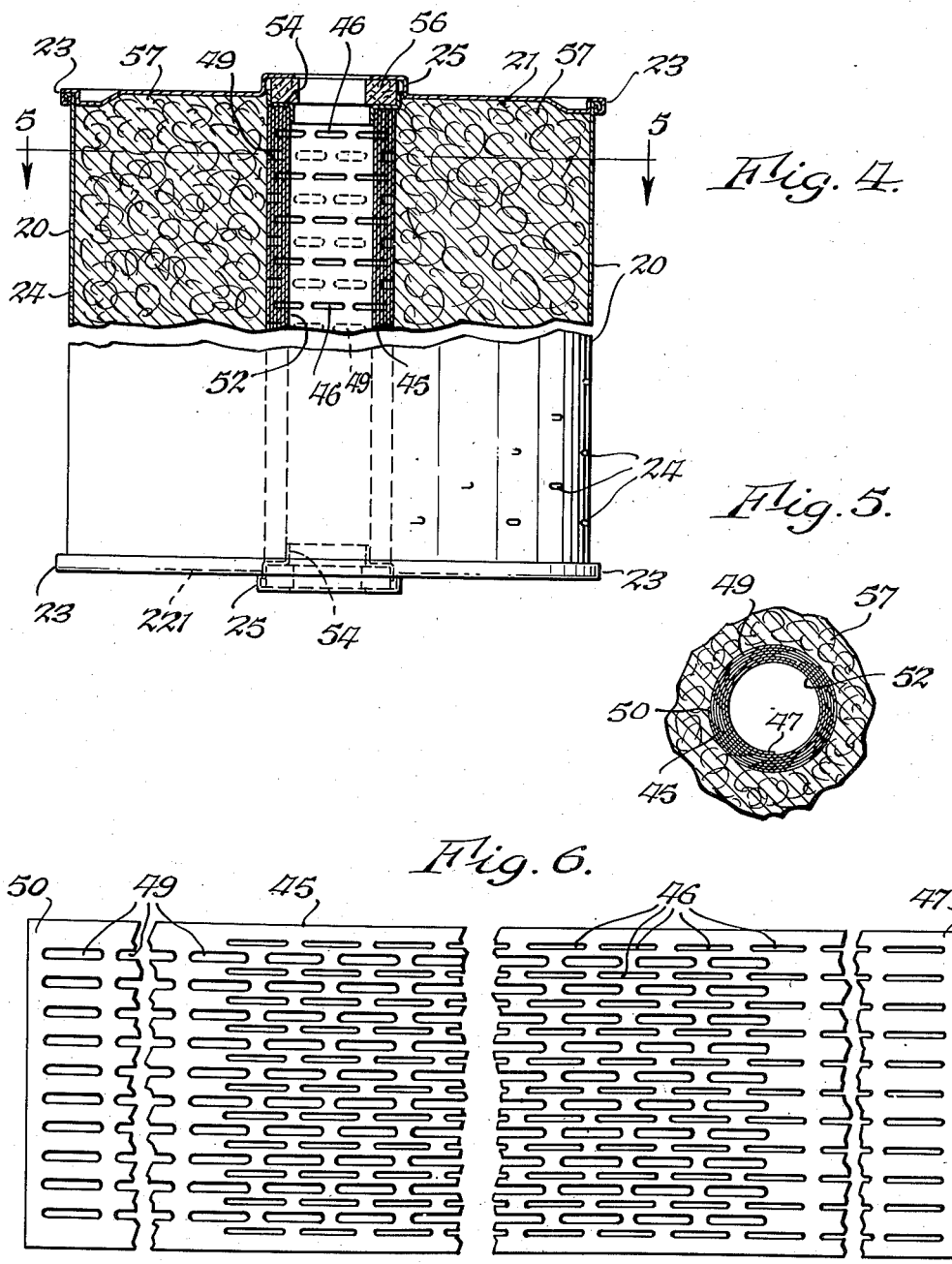

Patented Sept. 18, 1951

2,568,184

UNITED STATES PATENT OFFICE 2,568,184

FILTER ELEMENT

Joel B. Clark, Youngstown, Ohio, assignor to The Auto Appliance Patents Co., Youngstown, Ohio, Application October 24, 1946, Serial No. 705,360

3 Claims. (Cl. 210—183)

This invention relates to improvements in filters and more particularly to filter elements which may be removably arranged in filter housings so that one filter element may be readily replaced by another.

One of the objects of this invention is to provide a filter element of improved construction including a part through which fluid passes to remove coarse particles therefrom and an edge filter part which removes finer particles from the fluid which has passed through the first part of the element. A further object of this invention is to provide an element of this type of improved construction in which a paper edge filter part is employed for removing fine particles from the fluid which is being filtered and in which a fibrous material is provided for removing coarse particles from the fluid which is being filtered. A further object is to provide a filter element arranged in a container and including a hollow cylindrical body of edge filtering material in the axial portion of the container, and a body of porous material in said container surrounding said cylindrical body of edge filtering material to remove coarse particles from the fluid before the same passes to said edge filtering body.

Another object of this invention is to provide a filter element of improved construction formed to fit into a filter housing having a discharge passage therein, and in which the filter element is provided with sealing means of improved construction for preventing the filtrate from mixing with the fluid to be filtered. A further object is to provide a filter element of this type with a container of improved construction for the filtermass. Other objects and advantages of this construction will appear from the following description and claims.

In the accompanying drawings:

Fig. 4 is a fragmentary elevation, partly in section, of a filter element of modified construction.

Fig. 5 is a fragmentary transverse sectional view thereof, on line 5—5, Fig. 4.

Fig. 6 is a fragmentary view showing on a smaller scale portions of a strip which is wound in the form of a roll comprising a part of the filter unit.

Figure 1:
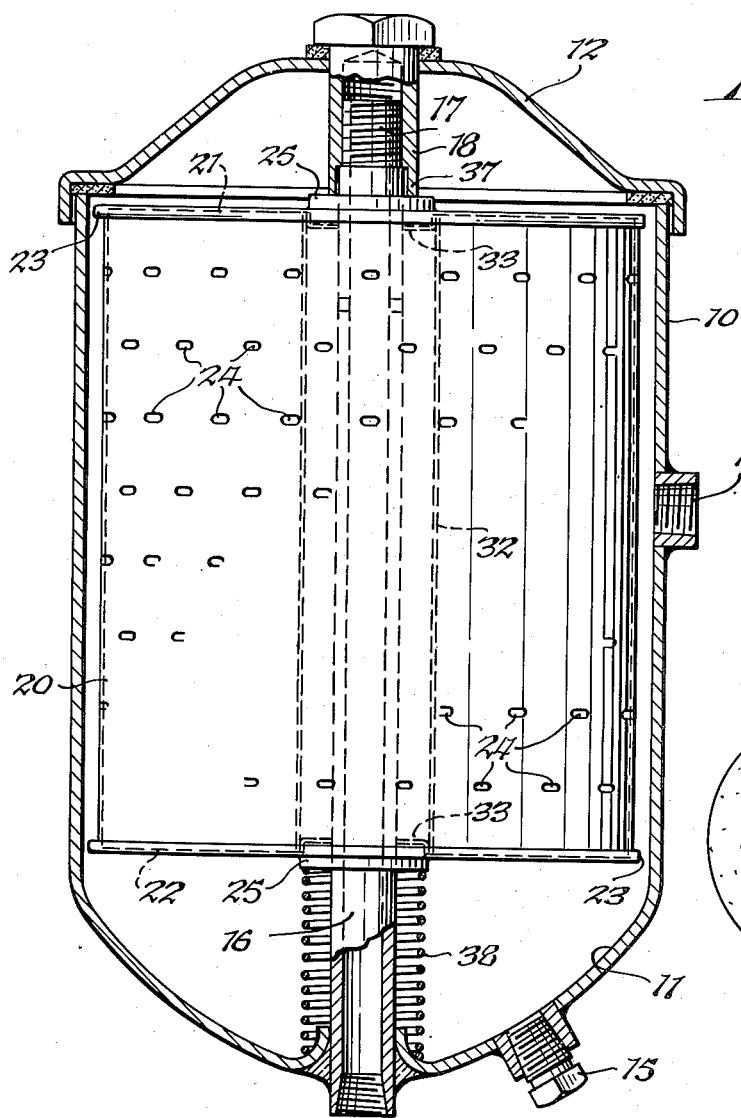
Fig. 1 is a central sectional elevation of a filter housing showing in elevation a filter element embodying this invention arranged in said housing.

The filter shown in the accompanying drawings is intended primarily for use in connection with internal combustion engines for filtering the crank case oil of the same substantially continuously during the operation of the engine, but it will be understood that it is not intended to limit this invention to use in connection with internal combustion engines, nor with the filtration of oil, since obviously the filter may equally well be used with other fluids.

The housing of the filter may be of any suitable or desired construction, that shown including a shell having a cylindrical side wall portion 10 and a convex hollow bottom 11 preferably formed integral with the side wall 10, and 12 represents a removable lid or cover for the housing. The housing, as shown, is provided with an inlet 14 for the liquid to be filtered, and a drain plug 15 by means of which a housing may be emptied or sediment removed therefrom.

16 represents a tube centrally arranged within the housing and extending outwardly through and secured to the bottom thereof. The lower end of this tube is threaded or otherwise adapted for the connection of piping or tubes for carrying the filtrate from the housing. This tube 16 is provided at its upper end with an external thread 17, with which an internally threaded cap or nut 18 may cooperate, the cap extending through an aperture in the cover or lid 12, and having an enlarged head serving to clamp the lid on the housing. Housings of this type have heretofore been used in connection with oil filters and the housing, of itself, does not constitute any part of this invention, and the various features of this invention may be used in connection with tanks or housings of other constructions.

The filter element embodying this invention includes a container for the filter mass, which may be of any suitable construction and formed to fit within the shell 10 of the filter housing. The container shown includes a cylindrical body 20 having upper and lower end walls 21 and 22 secured to the ends thereof in any suitable manner, for example, by means of seams 23 such as commonly used in the manufacture of sheet metal cans. The body 20 is provided with a plurality of holes or apertures 24 through which the fluid to be filtered may pass. The ends walls are preferably provided with central bosses or outwardly extending annular projections 25 with central openings 26 therein of such diameter that the central tube 16 of the filter housing may pass through the same.

In filter housings of the type shown in the drawings, the fluid to be filtered which enters through the inlet opening 14 passes through the apertures 24 of the container, and after passing through the filtermass in this container, the filtrate is discharged into the tube 16 and then discharged from the housing. In accordance with this invention, the filtermass comprises two parts, one part being in the form of relatively coarse filter material, such for example as cotton waste or other fibrous substance through which the fluid to be filtered passes, and which removes the relatively coarse foreign material from the fluid. After this coarse filtration, the fluid reaches the other part of the filtermass, which removes the finer particles of foreign material from the fluid. This part of the filtermass may be of any suitable kind such, for example, as a filtermass made of a plurality of layers of filter paper or other substance having a large number of edges between which fluid to be filtered passes between said layers, the material also having very small pores or interstices through which the fluid may pass. The extent to which fluid may pass between the layers of material may be controlled by the extent to which the adjacent layers of material are pressed into contact with each other.

Consequently, in order to arrange the two parts of the filtermass so that the fluid to be filtered passes first through the coarse part of the filtermass and then through the fine filter part of the mass, the fine filter part is arranged in proximity to the axis of the container wall 20 and the coarse filtermass is arranged between the outer cylindrical wall 20 of the container and the fine filter part thereof. For this purpose, in the construction shown in Figs. 1 to 3, I provide a stack of edge filter disks 28 which may be made of paper or other suitable material, or the disks may be made of filter paper through or between which the fluid may pass. The disks are of an internal diameter which is larger than the external diameter of the discharge pipe 16 so as to form between the stack of disks 28 and the tube 16 a space 29 in which the filtrate may collect, and the central tube 16 is provided with the usual discharge openings or holes 30 through which the filtrate may flow from the space 29 into the discharge tube 16.

In order to keep these disks in alinement to form a tubular stack, a perforate cylinder 32 is preferably provided within which the stack of disks fits. This cylindrical part may be made of sheet metal or other suitable rigid material, and the ends of this cylinder may be partly closed by means of annular flanged disks or cupped rings 33, each having a circumferential flange which may be welded or otherwise secured to the perforate cylinder 32, and a radially extending flange 34 against which an end of the stack of disks 38 may abut. The disks 28 may be made of paper, cardboard, metal, or other material suitable for filtration and the surfaces thereof may be such as to vary the degree of filtration desired and the rate of flow of fluid between the surfaces, it being well known that disks with rough surfaces permit the passage of coarser particles of foreign material to pass between the surfaces of the disks than when the disks are provided with smooth surfaces. Consequently, if the disks are made of paper, they may be provided with smooth or rough surfaces, depending upon the degree of filtration desired. The disks may also be made of filter paper, so that the fluid being filtered may pass through the paper of the disks 28, or both through the paper and through the spaces between the disks.

In assembling this edge filter part of the filter element, an annular flanged disk 33 may be welded or otherwise secured to one end of the perforate cylinder 32, whereupon the stack containing the desired number of disks 28 is placed into the perforate cylinder 32. Another similar disk 33 may then be applied to the other end of the perforate cylinder 32 and pressed against the stack of disks with the desired pressure and then secured in place by spot welding or in any other suitable manner. It is, of course, well known that the degree of filtration may be varied by varying the pressure applied to the stack of disks 28.

Means are also provided for tightly sealing the ends of the cylindrical space 29 between the tube 16 and the stack of disks 28 so as to prevent unfiltered fluid from entering this space. This can be readily accomplished by making the flanged annular disk 33 of approximately the same outside diameter as the bosses or projections 25 on the container ends 21 and 22. A sealing ring 36 of cork or other suitable flexible material which is inert with reference to the fluid which is being filtered is placed into each of the oppositely facing annular spaces formed by the bosses 25 and the annular flange members 33 as clearly shown in Fig. 2. This gasket ring 36 may be made of an internal diameter slightly less than the external diameter of the tube 16, so as to form a tight seal therewith. Preferably in addition, I provide means for applying pressure to the bosses or projections 25 in such a manner as to compress the sealing ring 36 into tight contact with the tube 16 and the outer walls of the bosses, and in the construction shown for this purpose, the threaded cap or nut 18 is provided with a skirt or extension 37 which extends beyond the threaded portion of the upper end of the tube 16 and presses against the upper boss or projection 25 of the container end wall 21. A coil spring 38 is provided at the other end of the container and bears against the other boss or projection 25 of the container end wall 22 so as to compress the other sealing ring 36. It must be borne in mind that the container for the filtrate is made of thin metal which can be readily flexed and the perforate cylinder 32 may be made of a length slightly less than the normal distance between the container ends 21 and 22 so that when the pressure is applied to the container ends 21 and 22, the end walls of the container may be flexed into contact with the relatively rigid cylinder 32 and the annular flanged members 33 secured thereto, so that ample compression of the gaskets 36 will result.

The space between the inner edge filter part of the filtermass and the cylindrical outer wall 20 of the container may be filled with any suitable filter material for effecting partial filtration of the fluid entering the perforations 24. Cotton waste or other fibrous or granular materials may be employed for this purpose with which the annular space within the container between the outer wall 20 and the cylinder 32 is tightly packed so that all fluid passing to the inner filter part of the filtermass must first pass through the coarse filtermass 40.

Figure 3:
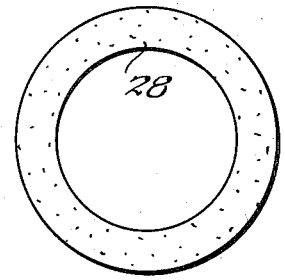
Fig. 3 is a face view of one of the rings of the edge filter part of my improved element.
Figure 2:
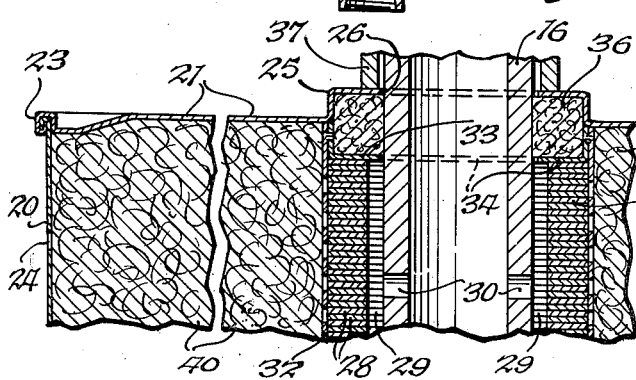
Fig. 2 is a fragmentary central sectional elevation, on an enlarged scale, of the filter element showing portions of the filter housing.

The construction shown in Figs. 4 to 6 is similar to that shown in Figs. 1 to 3, except that the inner part of the filtermass for removing finely divided particles from the fluid passing through the filter is of different construction. In this filter element the inner part of the filtermass is made of a roll of paper or other filter material formed from a flat strip of this material 45 shown in Fig. 6 having two series of slots therein arranged in rows extending parallel to the longitudinal edges of the strip. Each of these slots is longer than the longitudinal space between slots. Alternate rows have slots 46 and these rows extend to one end 47 of the strip and terminate at a distance from the other end of the strip. The other rows of slots which are spaced between the first mentioned rows are made up of slots 49 also spaced from each other lengthwise of the strip at distances less than the length of the slots. The slots 46 extend to the other end 50 of the strip and terminate in spaced relation to the end 47. Consequently, when a strip of this type is rolled into a hollow cylinder 52 shown in Figs. 4 and 5, the slots 46 of adjacent turns of the roll will form passages which are open at one cylindrical surface of the roll and which terminate in spaced relation to and are closed at the other cylindrical surface of the roll, the imperforate lengths of the strip 45 between the end 50 of the strip and the adjacent ends of the rows of slots 46 forming a wall closing these ends of the passages. Similarly the slots 49 will form passages in the roll intermediate of the passages formed by the slots 46, and the passages formed by the slots 49 will be open at the cylindrical surface of the roll 52 at which the first mentioned passages are closed. In other words, if the strip 45 is rolled from the end 47 so that the other end 50 will be at the outer surface of the roll, then the passages formed by the slots 49 will be open at the outer cylindrical surface of the roll and will be closed at the inner cylindrical surface thereof, while the passages formed by the slots 46 will be open at the inner cylindrical surface of the roll and will be closed at the outer surface thereof. This type of filter part is similar to that shown in my co-pending application Ser. No. 628,006, filed November 13, 1945, now abandoned. The end portions of the strip, when rolled, are preferably cemented to adjacent turns of the roll, thus forming a relatively rigid hollow cylindrical roll 52.

In the operation of this roll, if the same is wound as described, fluid will enter the passages formed by the slots 49 and by edge filtration will pass between adjacent layers of the roll to the passages formed by the slots 46 and will then be discharged into the interior of the roll. The strip 45 may be made of filter paper, in which case, the filtrate may flow through the paper itself, or both through the paper and the spaces between adjacent layers or turns of the roll.

The ends of the roll may be reinforced by annular flanged disks 54 of Z-shaped cross section, one flange of each disk 54 extending into the interior of the cylindrical roll 52.

In this construction, gaskets 56 of packing material, such for example as cork, are arranged in the bosses or projections 25 of the container ends 21 and 22 and the outer flanges of the annular disks 54 may telescope into these bosses 25 and engage the outer periphery of the gaskets 56.

The space between the roll 52 and the outer cylindrical wall 20 of the housing is filled with cotton waste or other suitable filter material 57.

When a filter element of this type is placed in a housing, such as shown in Fig. 1, and pressure applied to the bosses 25 by means of the spring 38 and the projecting part 37 of the cap 18, the gaskets 56 will be compressed to form tight seals between the central tube 18 and the inner filter part. The roll 52, even when made of paper, has sufficient rigidity so that the metal cylinder 32 employed in the construction shown in Figs. 1 and 2, can be omitted. The operation of the filter element shown in Figs. 4 to 6 is similar to that shown in Figs. 1 to 3.

The filter elements herein described have the advantage that they effect a very thorough filtering of the fluid passed through the same. Due to the fact that the coarse material is removed by means of the outer part of the element and only the small particles of foreign material are removed by the inner or edge filter part of the filter element, these filter elements can be used for long periods of time before they become so plugged up that they have to be replaced.

I claim as my invention:

1. A filter element for use in a housing having a central discharge tube for the filtrate, said element comprising an inner hollow substantially cylindrical filtering part for removing finely divided foreign matter from the liquid to be filtered, said cylindrical filter part having an inner diameter greater than the outside diameter of said discharge tube of said housing to form a space in which filtrate may collect and pass to said discharge tube, gaskets at the end of said cylindrical filter part forming a seal for the space between said tube and said cylindrical part for preventing liquid to be filtered from passing into said space beyond the ends of said cylindrical filter part, a substantially cylindrical container having end walls and a perforate peripheral wall, said end walls being provided with apertures through which said tube may extend, outwardly extending bosses on said end walls substantially concentric with said apertures therein and in which said gaskets are seated in fixed relation to said apertures, said gaskets having portions extending out of said bosses into the interior of said container, annular members engaging said gaskets and said cylindrical filtering part for holding the same in operative relation to said container, and a part mounted on said central discharge tube for applying pressure to said gaskets.

2. A filter element according to claim 1, in which said annular members are flanged rings each having a flange extending about the peripheries of said gaskets, said rings engaging said cylindrical filtering part and holding the same in fixed relation to said gaskets.

3. A filter element for use in a housing having a central discharge tube for the filtrate, said element comprising an inner hollow substantially cylindrical filtering part for removing finely divided foreign matter from the liquid to be filtered, said cylindrical filtering part having an inner diameter greater than the outside diameter of said discharge tube of said housing to form a space in which filtrate may collect and pass to said discharge tube, gaskets at the end of said cylindrical part forming a seal for the space between said tube and said cylindrical part for preventing liquid to be filtered from passing into said space beyond the ends of said cylindrical part, a substantially cylindrical container having end walls and a perforate peripheral wall, said end walls being provided with apertures through which said discharge tube may extend, parts on said end walls adjacent to said apertures engaging said gaskets for confining said gaskets in fixed relation to said apertures, and parts engaging said gaskets and said cylindrical filter part of said filter for holding said cylindrical filter part in substantially coaxial relation with said tube, and coarse filtering material in said container arranged between said cylindrical part and said perforate peripheral wall and through which liquid to be filtered and entering through the perforations of said peripheral wall must pass before passing through said cylindrical part.

JOEL B. CLARK.

REFERENCES CITED

The following references are of record in the file of this patent:

UNITED STATES PATENTS

| Number | Name | Date |
|---|---|---|
| 1,642,864 | Williams | Sept. 20, 1927 |
| 2,196,821 | Arnold | Apr. 9, 1940 |
| 2,337,238 | Griffith | Dec. 21, 1943 |
| 2,339,703 | Kamrath | Jan. 18, 1944 |
| 2,360,020 | Skinner et al. | Oct. 10, 1944 |

FOREIGN PATENTS

| Number | Country | Date |
|---|---|---|
| 11,700 | Great Britain | of 1897 |
| 530,116 | Great Britain | Dec. 5, 1940 |
| 30,891 | France | June 29, 1926 |
| | (1st addition to 680,587) | |